United States Patent [19]

Chen

[11] Patent Number: 4,783,133

[45] Date of Patent: Nov. 8, 1988

[54] METHOD AND APPARATUS FOR FORMING A HOLOGRAM FROM INCOHERENT LIGHT

[75] Inventor: Hsuan S. Chen, Midland, Mich.

[73] Assignee: Saginaw Valley State University, University Center, Mich.

[21] Appl. No.: 900,548

[22] Filed: Aug. 26, 1986

[51] Int. Cl.$^4$ .................. G03H 1/26; G03B 35/08; G03B 35/18

[52] U.S. Cl. .................. 350/376; 350/3.83; 350/3.75

[58] Field of Search .................. 350/3.75, 3.66, 3.83, 350/3.84, 3.76; 354/112, 115, 118

[56] References Cited

U.S. PATENT DOCUMENTS

| | | |
|---|---|---|
| 1,970,311 | 1/1930 | Ives . |
| 2,151,124 | 3/1939 | Leitz .................. 354/166 |
| 2,186,615 | 1/1940 | Mihalyi .................. 354/166 |
| 2,386,614 | 10/1945 | Kaprelian .................. 354/166 |
| 3,034,411 | 5/1962 | Sauer .................. 354/289.1 |
| 3,063,352 | 11/1962 | Engelsmann .................. 354/289.1 |
| 3,148,606 | 9/1964 | Thomas et al. .................. 95/57 |
| 3,232,198 | 2/1966 | Breeman .................. 95/57 |
| 3,440,943 | 4/1969 | Sauer .................. 95/57 |
| 3,482,913 | 12/1969 | Glenn .................. 355/33 |
| 3,504,059 | 3/1970 | Glenn .................. 264/1 |
| 3,515,452 | 6/1970 | Pole .................. 350/3.5 |
| 3,533,676 | 10/1970 | Lin .................. 350/3.5 |
| 3,533,690 | 10/1970 | De Montebello .................. 350/130 |
| 3,547,510 | 12/1970 | De Bitetto .................. 350/3.5 |
| 3,547,511 | 12/1970 | King .................. 350/3.5 |
| 3,560,070 | 2/1971 | Pennington et al. .................. 350/3.66 |
| 3,560,071 | 2/1971 | Silverman et al. .................. 350/3.75 |

(List continued on next page.)

FOREIGN PATENT DOCUMENTS 2707325 8/1977 Fed. Rep. of Germany .

OTHER PUBLICATIONS

E. N. Leith, P. Voulgaris, "Multiplex Holography: Some New Methods", *Optical Engineering*, vol. 24, No. 1, Jan./Feb. 1985.

Yoichi Nagata, Joji Hamasaki, "Holographic Information Reduction by Lens Array", *Electronics and Commun. in Japan*, vol. 56-C, No. 8, 1973.

Pole, R. V., "3-D Imagery and Holograms of Objects Illuminated in White Light", *Applied Physics Letters*, App. Phy. Lett. 10, 20, Jan. 1, 1967.

Chen, Yu, "One-Step Rainbow Hologram", *Optics Letters*, Opt. Lett. 2, 85, Dec. 19, 1967.

DeBitetto, D. J., "Transmission Bandwidth Reduction of Holographic Stereograms Recorded in White Light", *Applied Physics Letters*, App. Phy. Lett. 10, 343, May 15, 1968.

DeBitetto, D. J., "Holographic Panoramic Stereograms Synthesized from White Light Recordings", *Applied Optics*, App. Opt. 8, 1740, Aug. 1969.

Chen, Tai and Yu, "Generation of Color Images with One-Step Rainbow Holograms", *Applied Optics*, App. Opt. 17, 1490, May 15, 1978.

Leith, Chen and Roth, "White Light Hologram Technique", *Applied Optics*, App. Opt. 17, 3187, Oct. 15, 1978.

Chen, Hsuan, "Astigmatic One-Step Rainbow Hologram Process", *Applied Optics*, App. Opt. 18, 3728, Nov. 15, 1979.

(List continued on next page.)

Primary Examiner—Bruce Y. Arnold
Assistant Examiner—Terry S. Callahan
Attorney, Agent, or Firm—Brooks & Kushman

[57] ABSTRACT

Provided is a systemic approach to creating a hologram from a sequential series of two dimensional transparencies each having a differing viewpoint of a scene taken simultaneously by a camera in incoherent light and a projection apparatus using coherent light in combination with said transparencies to form a rainbow hologram of the scene originally photographed. The invention utilizes a lenticular lens array to provide parallax information and a perpendicularly oriented cylindrical lens for focusing, along with additional optical enhancing elements, to obtain high quality rainbow holograms from scenes originally photographed in natural light.

41 Claims, 4 Drawing Sheets

U.S. PATENT DOCUMENTS

| | | | |
|---|---|---|---|
| 3,560,072 | 2/1971 | Silverman et al. | 350/3.75 |
| 3,561,840 | 2/1971 | Seki | 350/128 |
| 3,598,484 | 8/1971 | Redman | 350/3.5 |
| 3,608,993 | 9/1971 | De Bitetto | 350/3.5 |
| 3,625,584 | 12/1971 | St. John | 350/3.5 |
| 3,633,989 | 1/1972 | Benton | 350/3.5 |
| 3,677,617 | 7/1972 | Upatnieks | 350/3.5 |
| 3,765,741 | 10/1973 | Kimura | 350/3.5 |
| 3,834,785 | 9/1974 | Kimura | 350/3.5 |
| 3,884,545 | 5/1975 | Kasahara | 350/3.5 |
| 3,985,419 | 10/1976 | Matsumoto | 350/3.5 |
| 4,039,245 | 8/1977 | Yano | 350/3.5 |
| 4,082,415 | 4/1978 | Brooks et al. | 350/3.83 |
| 4,082,431 | 4/1978 | Ward, III | 350/3.82 |
| 4,086,585 | 12/1977 | Wah Lo et al. | |
| 4,130,338 | 12/1978 | Clay | 350/3.82 |
| 4,235,505 | 11/1980 | Hariharan | 350/3.77 |
| 4,283,109 | 8/1981 | Huff | 350/3.76 |
| 4,364,627 | 12/1982 | Haines | 350/3.76 |
| 4,394,063 | 7/1983 | Weiss et al. | 350/3.75 |
| 4,411,489 | 10/1983 | McGrew | 350/3.76 |
| 4,429,946 | 2/1984 | Haines | 350/3.76 |
| 4,445,749 | 5/1984 | Benton | 350/3.76 |
| 4,600,297 | 7/1986 | Winnek | 354/112 |
| 4,668,063 | 5/1987 | Street | 354/112 |

OTHER PUBLICATIONS

Leith and Chen, "Deep-Image Rainbow Holograms", *Optics Letters*, Opt. Lett. 2, 83, Jan. 4, 1978.

Chen, Hsuan, "Color Blur of the Rainbow Hologram", *Applied Optics*, App. Opt. 17, 3290, Oct. 15, 1978.

Okoshi, Takanori, "Three-Dimensional Displays", *Proceedings of the IEEE*, Proc. IEEE 68, 548, May 5, 1980.

Yu, Tai and Chen, "One-Step Rainbow Holography: Recent Development and Application", *Optical Engineering*, Opt. Eng. 19, 666, Oct. 1980.

Chen, Shan and Chen, "Aperture Conjugation Technique in Astigmatic Rainbow Holography", *Applied Optics*, App. Opt. 20, 3557, Oct. 15, 1981.

Chen and Chen, "Fabrication of a 360° Astigmatic Rainbow Hologram", *Applied Optics*, App. Opt. 22, 2474, Aug. 15, 1983.

Chen, Leith and Cheng, "A Method of Image Plane Multiplex Holography", *Optics Communications*, Opt. Comm. 48, 98, Nov. 15, 1983.

Hariharan, P.; "Optical Holography", *Cambridge Monographs on Physics*, Cambridge University Press (1984), Chapter 8.

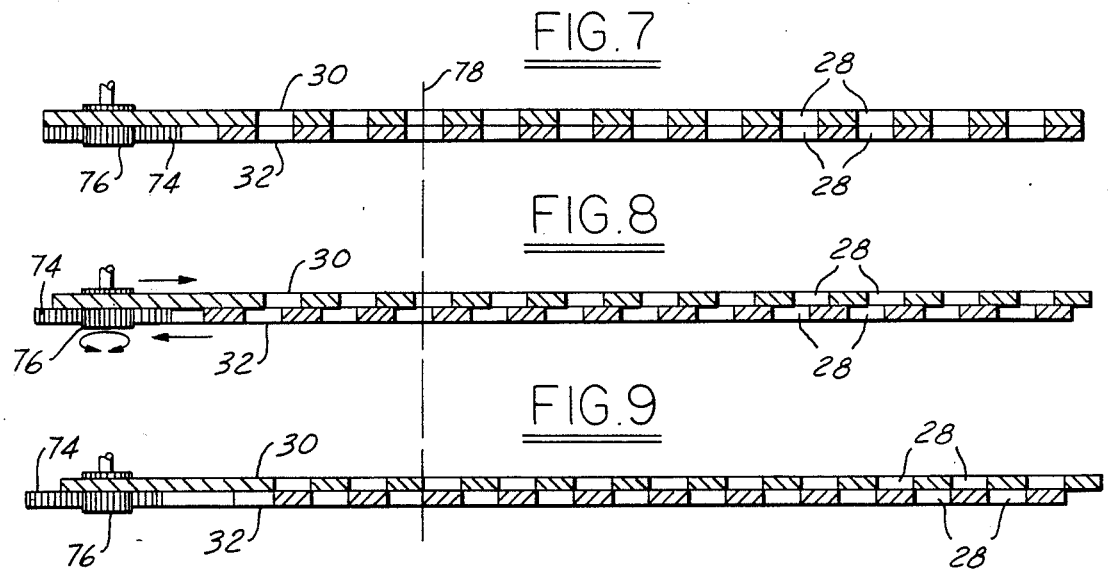
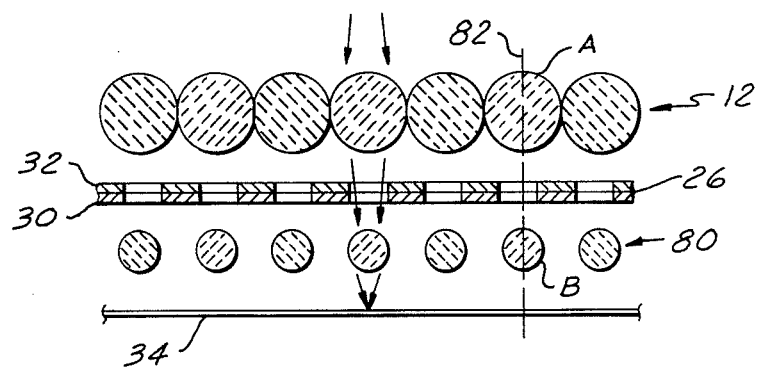
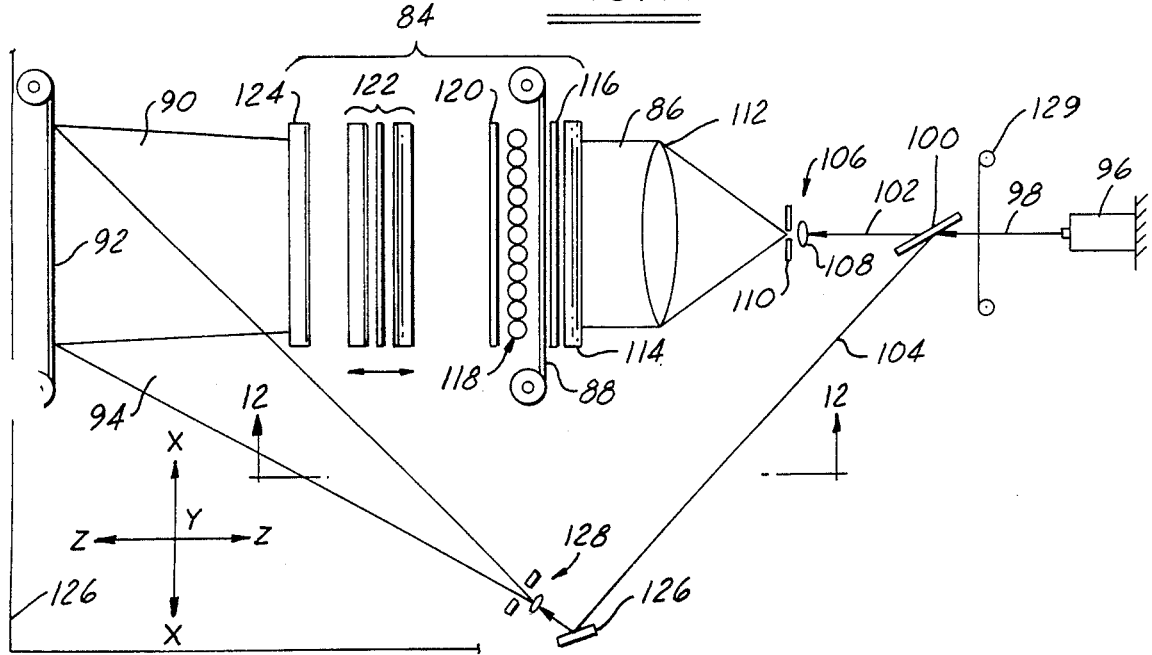

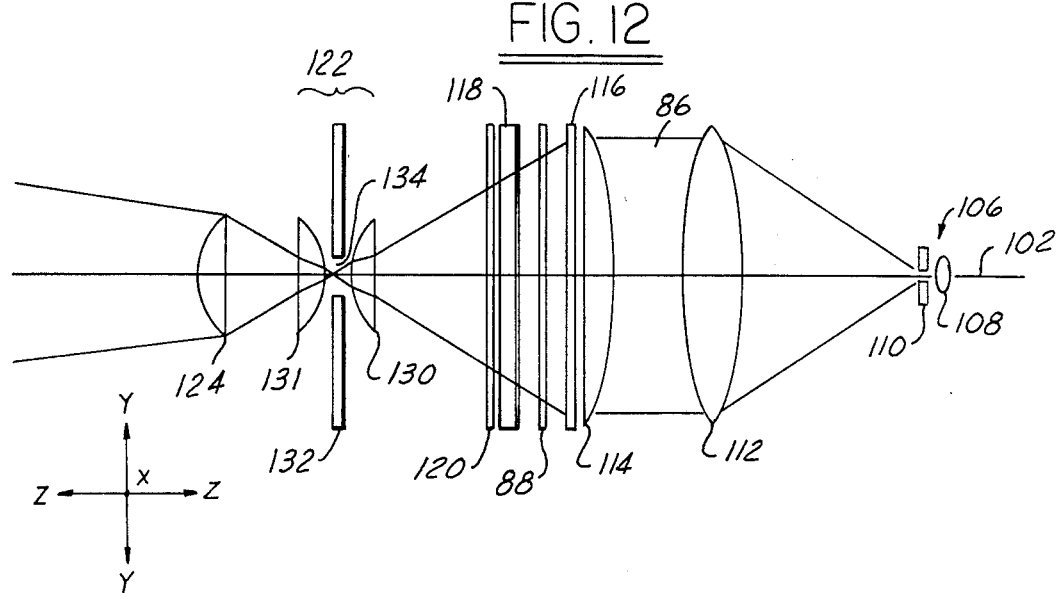
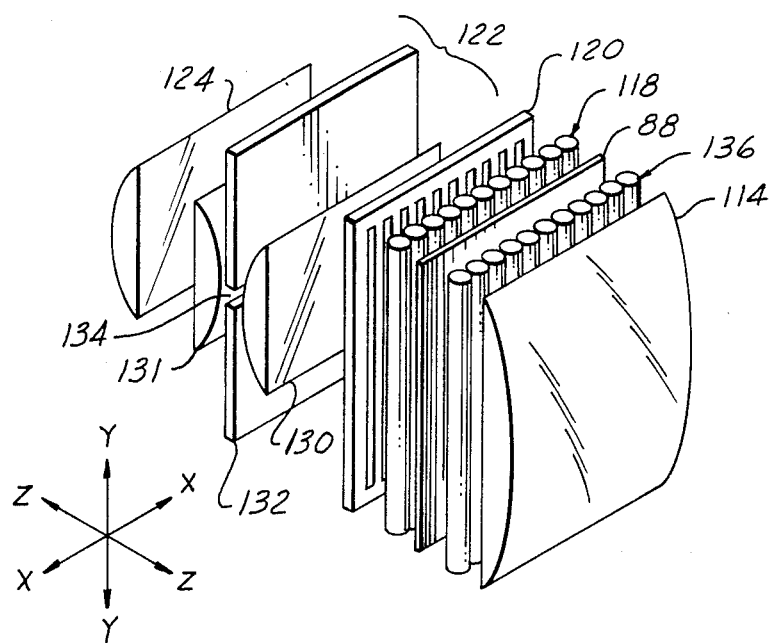

METHOD AND APPARATUS FOR FORMING A HOLOGRAM FROM INCOHERENT LIGHT

FIELD OF INVENTION

This invention relates to a method and apparatus for forming an autostereoscopic rainbow holographic recording, more particularly to a method and apparatus for forming holograms from a plurality of adjacent two-dimensional images on a photographic transparency taken in incoherent light.

BACKGROUND OF THE INVENTION

Over the years, much interest has been directed towards devising a means to produce good quality three-dimensional photographs. A number of schemes have been put forward. One system representative of these is disclosed in U.S. Pat. Nos. 3,482,913 and 3,504,059 to Glenn. Described therein is a technique wherein a plurality of cameras are located sequentially in a horizontal line to record images of a scene from differing viewpoints, which when assembled and viewed with a lenticular lens sheet, yield a stereoscopic view of the scene originally photographed. This sytem, called "lenticular photography" has the drawback that the lenticular lens sheet must be overlayed on the composite photograph for viewing. It also suffers from shallow field of view and "view flipping".

Recently, with the advent of lasers as a readily available source of coherent light, holograms have gained favor as the preferred means to create three-dimensional recordings of scenes. Unlike a conventional photograph, which is a recording only of light intensities reflecting off the surface of an object, a hologram records the curvature and relative orientation of the wavefronts of the reflected light off the object, as well as the intensities. This is accomplished by recording an interference pattern of the reflected light in relation to a reference beam of light. The resulting holographic recording contains all the information about the object necessary for viewing it in three-dimensional perspective. An excellent treatment of the various schemes to create three-dimensional photographs can be found in "Three Dimensional Displays", by T. Okoshi, Proc. IEEE 68, 548 (1980), hereby incorporated by reference.

First developed by Leith and Upatnieks at University of Michigan, early laser holography was accomplished in a laboratory under very high interferometric precision. In this scheme, a laser beam is split in two, one beam, called an object beam, is directed to illuminate an object, the light then reflecting to a holographic plate, the other beam, called a reference beam, is directed directly toward the photographic plate at an angle relative to the first so as to produce interference between the wavefronts of the beams at the plate. The resulting interference pattern between the beams is recorded on the plate, forming a hologram. The hologram so produced can be viewed from different angles, each revealing a different perspective of the object recorded with a parallax effect similar to what would be seen by looking at the object itself. A detailed description of holography, and its development, is contained in the book "Optical Holography" by R. Collier, C. Burckhardt and L. Lin, Academic Press, 1971.

Holography utilizing laser light to illuminate the object and expose the holographic film has several drawbacks: It is practical only for recording relatively small objects, close-up, indoors in a controlled environment, with expensive and potentially dangerous lasers. Several attempts have been made to overcome these limitations so that holographic recording of scenes of all kinds may be more easily and safely accomplished. These schemes involve the concept that a scene may be photographed in incoherent light from various viewpoints and in so doing record a large quantity of information concerning the objects in the scene, as suggested by Glenn, then using the information contained on the resulting images, to produce, with coherent light, a hologram having three-dimensional parallax.

Such a scheme was proposed by R. V. Pole in a scientific paper, App. Phy. Lett. 10, 20, 1967, hereby incorporated by reference and later in U.S. Pat. No. 3,515,452, hereby incorporated by reference. Therein he described a method to utilize a fly's eye lens array placed over a photographic plate for "spatially sampling" the object. The recording from the fly's eye lens is called an "integral photograph", an old technology in which the recording behind each lenslet is a miniature image of the object from that perspective viewpoint. Pole's "Holocoder" scheme includes both the "integral photograph" and the steps to convert it into a hologram. When the holographic film is developed, and put in its original position with illumination in the reverse direction, a truly three-dimensional image may be seen. If coherent light is used to illuminate the integral photograph, it may then be used as the object to record a hologram, the integral photograph substituting for the objects in the scene itself. Thus, the scene may be conveniently recorded in incoherent light, then the resulting integral photograph processed precisely in coherent light to produce a hologram. The disadvantage of this system is that a good quality fly's eye lens array is very difficult to fabricate, resulting in relatively poor optics. Additionally, there is no provision for focusing, each lens in the array having a very short fixed focal length in all directions. Also, there is a screen effect resulting from the lens array which yields a dot matrix appearance. Further, optical noise is focused by the array, becoming quite noticeable and objectionable. Finally, there is a very narrow field of view which results from the limited size of the lens array. These disadvantages have prevented the holocoder process from becoming successful. Others have attempted to improve on Pole's concept, with only limited success:

U.S. Pat. No. 3,598,484 to Redman, hereby incorporated by reference, discloses a "multiplexing" system to obtain a hologram from a series of photographs having differing perspective information. In this approach, a series of varied angle photographs are taken, developed into transparencies, then illuminated with coherent light in conjunction with angling the holographic plate to coincide with the original angle of the camera at the time of photographing the scene. This system requires precise alignment of the apparatus during a complicated series of holographic plate and transparency movements while assembling the multiplex hologram.

U.S. Pat. No. 3,608,993 to DeBitetto, hereby incorporated by reference, describes a linear lens array instead of the substantially square fly's eye lens matrix of Pole. This is used to reduce vertical parallax information, while retaining horizontal parallax information. A film stepping apparatus is needed to advance the holographic film vertically so that a composite hologram of parallel identical strips may be fabricated. The process is thus tedious and complicated and does not solve the problems indicated above in regard to the holocoder approach.

U.S. Pat. No. 3,765,741 to Kimura et al, hereby incorporated by reference, discloses the use of a horizontal lens array which is used to photograph a scene yielding only horizontal parallax information. Using this lens in combination with the photograph, the scene is projected on a screen and thereupon imaged through a fly's eye lens array and a second photograph is taken. Then laser light entering the fly's eye lens from the rear shines onto a holographic plate, forming a hologram. This system is extremely complicated.

U.S. Pat. No. 3,884,545 to Kasahara et al, hereby incorporated by reference, discloses the use of a matrix of high quality optical lenses instead of the closely spaced fly's eye lenses of Pole, effecting an improvement in the optics.

U.S. Pat. No. 3,985,419 to Matsumoto et al, hereby incorporated by reference, discloses a holocoder system where the invention is the inclusion of a diffusion screen, acting as a light scatterer, in combination with the multiple lens system to cause the images to be formed on the holographic plate reconstructing the image of the entire pupil of the imaging system. Scatterers are disclosed in earlier U.S. Pat. Nos. 3,608,993, 3,765,741 and 3,884,545, referenced above. In this method, there remains all the problems encountered with the Pole method, except that the imaging is enhanced due to use of the diffuser.

U.S. Pat. No. 4,039,245 to Yano, hereby incorporated by reference, shows a system in which a composite hologram is formed by use of a projector lens for each of a series of two-dimensional photographs. Coherent light having passed through the photograph-lens combinations reaches a screen, which could be a lenticular lens array with a diffusion reflecting surface behind it, where each lens element disperses light in one orthogonal direction and redirects light in the other orthogonal direction so as to cause images from each photograph to appear at differing points on the holographic plate. This concept utilizes high quality projector optics, but the process is complicated and elaborate.

U.S. Pat. No. 4,445,749 to Benton, hereby incorporated by reference, shows a system in which a hologram is constructed from a number of two-dimensional photographs by means of a recording system in which a series of strip holograms are formed by use of a mask which exposes strips of a holographic plate sequentially from one side to the other as each two-dimensional photograph is individually illuminated. The resulting hologram is in turn illuminated as the object for exposure of another holographic plate, forming the final hologram.

In the scientific journal literature, D. J. DeBitetto describes an approach to reduce vertical parallax information using strip hologram techniques in his articles in Appl. Phy. Lett. 12, 343, 1968 and Appl. Opt. 8, 1740, 1969, both articles hereby incorporated by reference. Generally, he discloses the underlying principles of the above referenced U.S. Pat. No. 3,608,993.

Applicant, along with Leith and Cheng, describe in an article published in Optics Communications, Opt. Comm. 48, 98 (1983), which is incorporated by reference herein, the idea of combining lenticular photography with multiplex holography. The result is a hologram having a substantial vertical raster line effect.

In the present invention a method and apparatus are disclosed which solve all of the holocoder deficiencies, while at the same time bringing holographic picture taking out of the laboratory and into the hands of unsophisticated users.

Accordingly, it is an object of the invention to provide a recording camera for simultaneously photographing a sequential series of two-dimensional images in incoherent light and a hologram construction apparatus using coherent light to convert the relative parallax information obtained from each of the images into a three-dimensional hologram.

It is an additional object of the invention to provide a camera means to photograph any kind of scene in ordinary incoherent light which is easy to use and functions similarly to a conventional camera, the resulting image recorded being adaptable to constructing a hologram having acceptable parallax properties.

It is yet an additional object of the invention to provide a hologram construction apparatus employing coherent light which utilizes the two-dimensional images produced by the camera to produce a rainbow hologram in one simple step.

It is a further object of the invention to provide an imaging system which is of high quality optical properties.

It is yet a further object of the invention to provide a focusing lens system that allows for sharp image recording and simultaneously reduction in optical grain noise.

It is still an additional object of the invention to provide an imaging system which does not suffer from a dot matrix appearance or a grid line appearance.

It is yet a further object of the invention to provide an optical imaging system which prevents optical crosstalk and allows control over the f-stop, and, accordingly, depth of field.

It is still a further object of the invention to provide an optical imaging system having an achromatic and astigmatic compound lens arrangement.

These, and additional objects, advantages, features, and benefits of the invention will become apparent from the following specification.

SUMMARY OF THE INVENTION

Provided by the present invention is a systemic approach to creating holograms, consisting of a camera adapted to simultaneously take a sequential series of photographs each having a differing viewpoint of a scene illuminated by incoherent light and a projection apparatus adapted to utilize transparencies produced from said photographs to produce in one step a rainbow hologram. While the present invention constructs a hologram from a series of two-dimensional images, it is far more partical and much improved over Pole's holocoder technique, as well as all attempts to improve upon it.

To produce a series of adjacent two-dimensional images, the present invention discards the use of a fly's eye lens, because it is too restrictive in terms of focusing and quality, in favor of a lenticular lens array having a series of adjacent closely spaced elongated substantially cylindrically shaped lenses, each lens being of high optical quality and oriented to focus light rays in the horizontal, or human eye, axis. An example of such a lens array is contained in U.S. Pat. No. 3,561,840, hereby incorporated by reference. Additionally, a large cylindrical lens system is perpendicularly oriented in front of the array to act as an independent focusing agent for light rays in the vertical axis. The combination of these lenses permits control over focusing and produce a series of images readily adaptable for use in the hologram construction apparatus. A baffle set is also provided which serves to remove optical cross-talk among the lenslets of the array; additionally, it serves the dual purpose of an f-stop control to improve depth of field. In an alternative embodiment, the imaging system employs two sets of lenticular arrays in a manner which allows for the optical quality attainable by compound lens systems.

To produce a hologram having vertically limited parallax information from the series of adjacent two-dimensional transparencies, the present invention employs a technique based upon that developed by Benton in U.S. Pat. No. 3,633,989, hereby incorporated by reference, in which a mask having a horizontal slit is employed to cut-off vertical parallax information from a hologram that is being used to expose a second hologram. The Applicant, in a series of scientific journal articles in which he authored or co-authored, Opt. Lett. 2, 85 (1967), Appl. Opt. 17, 1490 (1978), Appl. Opt. 17, 3187 (1978), Appl. Opt. 18, 3728 (1979), Opt. Lett. 2, 83 (1978), Appl. Opt. 17, 3290 (1978), Opt. Eng. 19, 666 (1980), and Appl. Opt. 22, 2474 (1983), all of which are hereby incorporated by reference, discloses a means to accomplish reduction of the vertical parallax information in one-step process, known as one-step rainbow holography. The present invention, employing this technique, utilizes a cylindrical lens doublet in combination with a slitted mask to yield a full horizontal parallax but limited vertical parallax "rainbow" hologram.

BRIEF DESCRIPTION OF THE DRAWINGS

FIGS. 7 through 9 show a cross-section plan view taken along view 7—7 in FIG. 6 of the baffle set and f-stop control in selected f-stop positions.

FIG. 10 is a plan view of an alternative imaging system embodiment utilizing a second lenticular array.

FIG. 11 is a plan view of the hologram construction apparatus according to the invention.

FIG. 12 is a side view of the hologram construction apparatus in FIG. 11 taken along lines 12—12.

FIG. 13 is a perspective view of an alternative embodiment of the illumination system for the hologram construction apparatus.

DETAILED DESCRIPTION OF THE PREFERRED EMBODIMENT

The invention is a two-step, fully integrated approach to obtaining a holographic recording of a scene illuminated by incoherent light. In the first step a specially adapted camera is utilized to obtain a series of photographic images having sequentially differing parallax information concerning the scene; in the second step, the images are utilized to record a rainbox hologram in a simultaneous exposure utilizing coherent light. In both steps, a lenticular lens array is used in concert with a perpendicularly oriented cylindrical lens system.

PHOTOGRAPHIC IMAGE RECORDING APPARATUS AND METHOD

Figure 1:
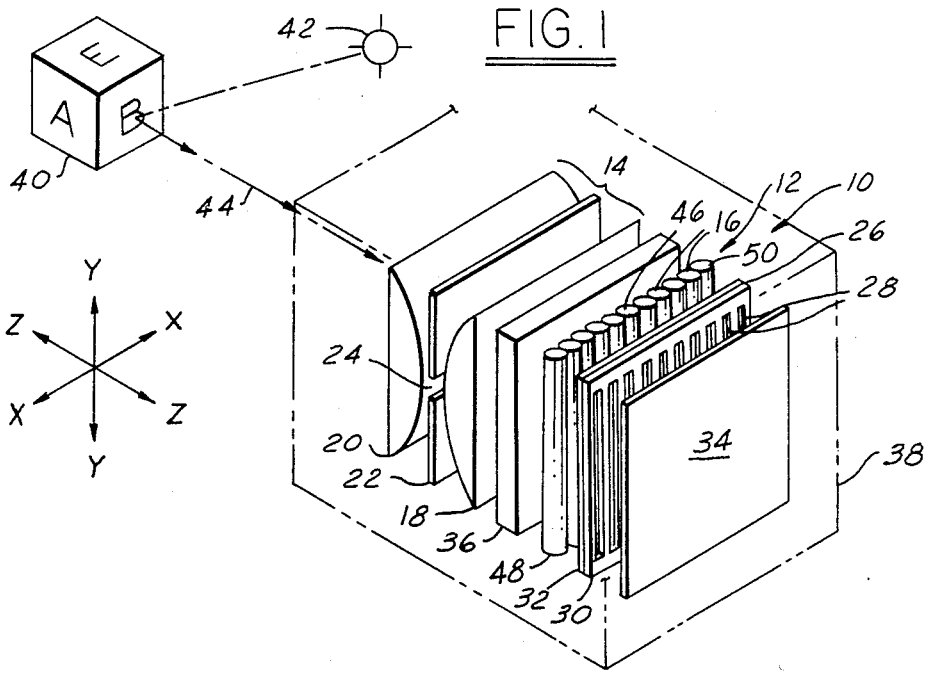
FIG. 1 is a perspective view of the optical imaging system according to the invention shown pointed at an object.

Referring now to the drawings, FIG. 1 shows a detailed exploded view of the optical imaging system 10 used to create a series of adjacent images having sequentially differing viewpoints of an object. The optical imaging system is composed of two lens elements: a lenticular lens array 12 and a cylindrical lens system 14 oriented perpendicular thereto. The lenticular lens array is composed of a plurality of long, generally cylindrical lenslets 16 arranged adjacent to each other side-by-side in a common plane along an axis x—x which is perpendicular to their cylindrical axis y—y. Each of the lenslets is on the order of 2 to 3 millimeters in cross section and has a small fixed focal length with excellent optical characteristics designed to focus light in the x dimension only. Lenticular lens arrays are well known in the art and vary in design as exemplified in U.S. Pat. No. 3,561,840, hereby incorporated by reference.

In the preferred embodiment, cylindrical lens system 14 is a compound lens unit having a cylindrical lens doublet composed of two cylindrical lenses 18 and 20 each having a convex side and opposing flat side, and a mask 22 having a centrally located slit 24 which is oriented along the x—x axis. The cylindrical lenses are positioned so that their convex surfaces face the mask, as shown in FIG. 1. Various alternative cylindrical lens designs could be used having different cross sectional shapes. It is possible that one cylindrical lens could be used, with its convex side facing an object; however, the doublet with integral slitted mask is preferred as spherical aberration is minimized by its use. The cylindrical lens system extends along a line parallel to the x—x axis and is designed to adjustably focus light in the y dimension only, by movement of the lens along the axis z—z, which is the direction of incoming light. By contrast, the lenslets require no repositioning for focusing as their very small focal length results in essentially any object in the scene being positioned optically at infinity; hence, the lenticular array need only be fixed in place so that the photographic film is located at the focal point of the lenslets. Thus, the combination of the lenticular lens array and the cylindrical lens system permits independent focusing of the light in the x and y dimensions.

A baffle set 26, having substantially the same overall area as the lenticular lens array, is placed on the opposite side of the lenticular lens array from the cylindrical lens system. Its purpose is twofold: to serve as a means to eliminate optical crosstalk between adjacent lenslets and also to serve as an f-stop (exposure) control. This is accomplished by providing a series of elongated apertures 28, spaced and oriented to coincide with the optical axis of the lenslets. To provide f-stop control, the baffle set is composed of two adjacent baffle members 30 and 32, the relative motion of which accomplishes reduction or expansion of the aperture width with consequent affect on light passage therethrough. It should be noted that an alternative embodiment could employ a fixed aperture baffle set and utilize a variable width slit 24 in the mask 22 to achieve f-stop regulation. Behind the baffle set, farther away from the lenticular array, is located a photographic film 34. The film must be capable of being developed into a transparency for purposes of later producing a hologram from the images photographed in accordance with the invention, as will be detailed shortly. Shown also in the figure is part of a shutter mechanism 36 used to control exposure of the film to incoming light.

The optical imaging system in the preferred embodiment is placed in a light tight body 38, shown in phantom. For laboratory work in a darkroom and under controlled environmental conditions the body could be dispensed with.

Shown in FIG. 1 is the optical imaging system 10 oriented to photograph object 40 illuminated by a source of incoherent light, such as the sun 42. The relative orientation is also shown between the optical imaging system 10, the object 40 and the reflected light 44.

The effect of the optical imaging system on the incoming light is to cause long and narrow, horizontally compressed images to appear on the film 34 in discrete locations, behind each baffle aperture and corresponding lenslet. Each of the lenslets 16 sees a slightly different perspective view of the object, which is recorded on the photographic film 34 directly to its rear. Accordingly, simultaneously a sequential series of images is produced on the film in response to light imaged independently by each of the lenslets in combination with the cylindrical lens system 14. For the purpose of simplifying the drawing, the lenticular lens array shown has only eleven lenslets. In practice there may be over one hundred lenslets depending on the amount of parallax data required to be recorded. The degree of parallax effect depends upon the length of the lenticular lens array along the x—x axis. For parallax effects simulating normal vision, a lenslet array slightly wider than human eye spacing is acceptable. Larger width arrays will yield superior parallax effects.

Figure 2A:
FIGS. 2a through 2c show a sampling of the perspective views of the object in FIG. 1 as recorded by the imaging system of FIG. 1.
Figure 2B:
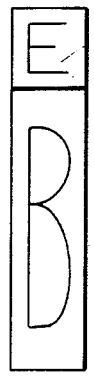
Figure 2C:

An example of the horizontal compression and vertical extension of images as processed by the optical imaging system is shown in FIGS. 2A through 2C. It will first be noticed from FIG. 1 that the object 40 is a cube having lettering to identify which side is being viewed. In the figure, the optical imaging system is aimed directly at side "B", at a slightly elevated angle, showing side "E" at a very low angle of sight. FIG. 2B shows the image of the box after being processed by the imaging system through lenslet 46, which is located in the center of the array. FIG. 2A shows the image formed behind lenslet 48, which includes, due to its perspective view of the object, an angled view of side "A" as well as an angled view of sides "B" and "E". FIG. 2C shows the image of the box behind lenslet 50, which includes, due to its viewpoint, an angled view of side "C" and an angled view, in the opposite direction from that of FIG. 2A, of sides "B" and "E". It will be understood, therefore, that each of the images formed as a result of the optical imaging system contains data concerning a particular directional view of the object being photographed.

The optical imaging system described has advantages over the holocoder system of Pole and the others cited above because it utilizes extremely high quality optics which are astigmatic and achromatic, are easily fabricated, have the capability of independent focusing in the x and y dimensions and have the inclusion of a baffle to eliminate crosstalk and afford a variable f-stop. Additionally, the use of a single array contained within one imaging system, obviates the multi-camera position approach to create a series of photographs having parallax information. However, the camera disclosed by the present invention is adaptable to a multi-position approach for assembling the multi-image transparency. This is done by using one centrally positioned lenticular lens 46 coupled with the cylindrical lens system 14. The baffle 26 could be dispensed with. Various perspective aspects of the scene would be photographed by taking single photographs at various spaced positions in the manner disclosed in the patents cited in the Background of the Invention. Assembly of the resulting images can be by the sequential photographing and stepped advance of the film, or images can be physically assembled in an array.

Figure 3:
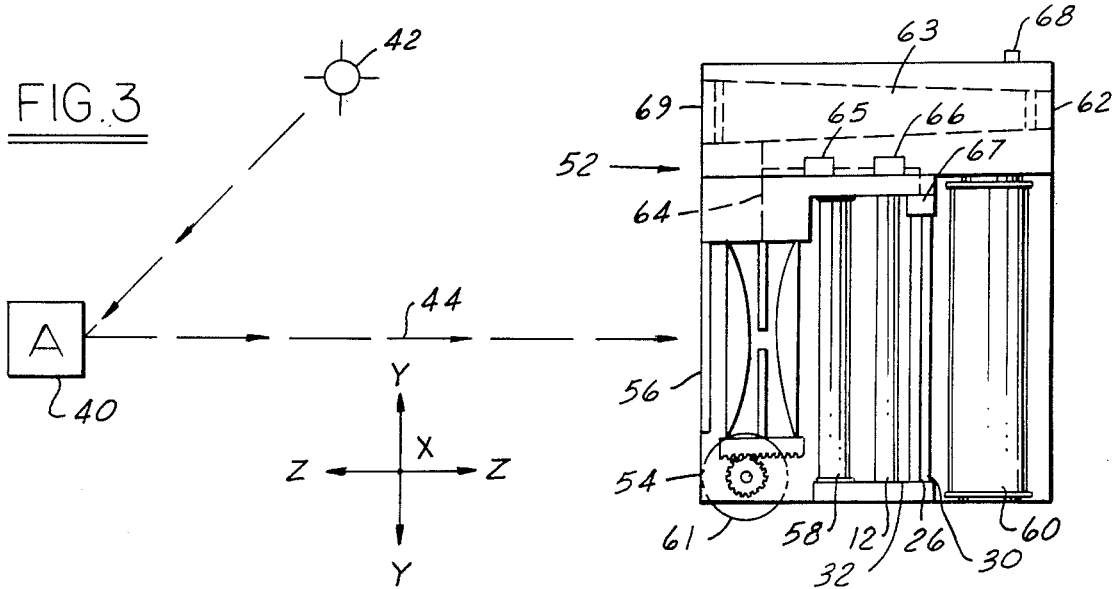
FIG. 3 is a side view of the camera system according to the invention.

FIG. 3 shows the camera imaging system according to the preferred embodiment of the invention. Light from incoherent source 42 illuminates object 40, the light then reflecting to the camera. The camera 52 is composed of a light tight housing 54 having an optical window 56 in the front. Behind the optical window, inside the housing, is located the before described optical imaging system 10. In this regard, it will be seen that cylindrical lens system 14 is mounted in front of a shutter, here shown as a spool therefor 58, which in turn is in front of the lenticular array 12, followed by the baffle set 26, having members 30 and 32, finally followed by photographic film, here shown as a roll therefor 60, as is used in an ordinary camera. A focusing adjustment 61 is provided which allows the cylindrical lens system 14 to be variably positioned along the z—z axis. Focusing is performed in response to an image viewed through eyepiece 62 in a view finder 63 located on the camera housing. The view finder has a combined function of scene framing, range-finding and light exposure indication, all of which are very well known in the art, as exemplified by U.S. Pat. Nos. 2,151,124, 2,186,615, and 2,386,614, concerning range and view finders and 3,034,411 and 3,063,352 concerning light exposure meters, allof which are hereby incorporated by reference. By a cooperative connection 64 between the cylindrical lens system 14 and the combined range and view finder 63, adjustment of the focuser 61 will result in lens adjustment in the combined range and view finder 63 causing the image therein to be more or less focused in response thereto. Because the combined range and view finder is calibrated to be in focus when the cylindrical lens system is, the adjustment of the focuser 61 results in a true indication of real focus simultaneously for the combined range and view finder and cylindrical lens system. A position sensor 65 senses the location of the cylindrical lens system 14 when it is positioned to focus light on the film. This information is electronically sent to a microprocessor 66 which sends a signal to a light emitting diode 67 to record a numerical code on the film when a shutter button 68 is pressed exposing the film to light from the object. Other means to accomplish this may occur to those skilled in the art; this means is preferred for its simplicity and accuracy. The shutter 36 is preferably of a focal plane shutter design which is very well known in the art, exemplified by U.S. Pat. Nos. 3,148,606; 3,232,198 and 3,440,943 hereby incorporated by reference. Operation of the timing of the shutter is correlated to the setting of the f-stop via the baffle set 26. The mechanism to accomplish this may be either automatic or manual in operation and is within the skill of the art to accomplish, as exemplified by the above cited camera patents.

Figure 4:
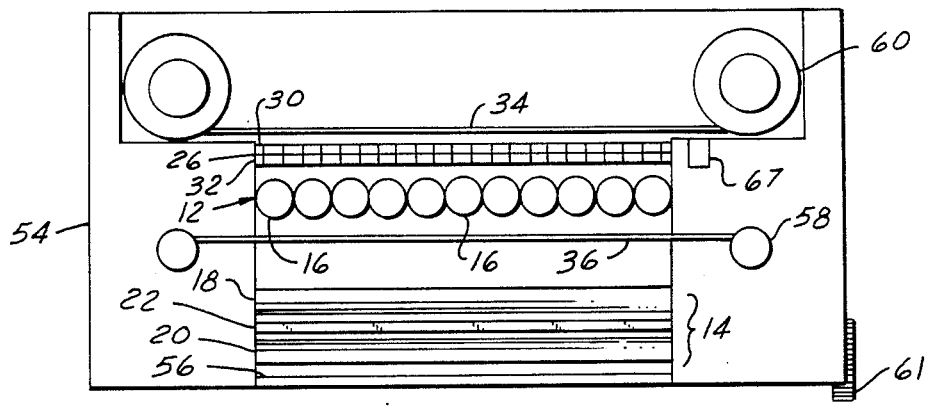
FIG. 4 is a plan view of the camera in FIG. 3, with the view finder-range finder removed.

FIG. 4 shows the camera from a top view with the view finder-range finder exposure mechanism removed.

Figure 5:
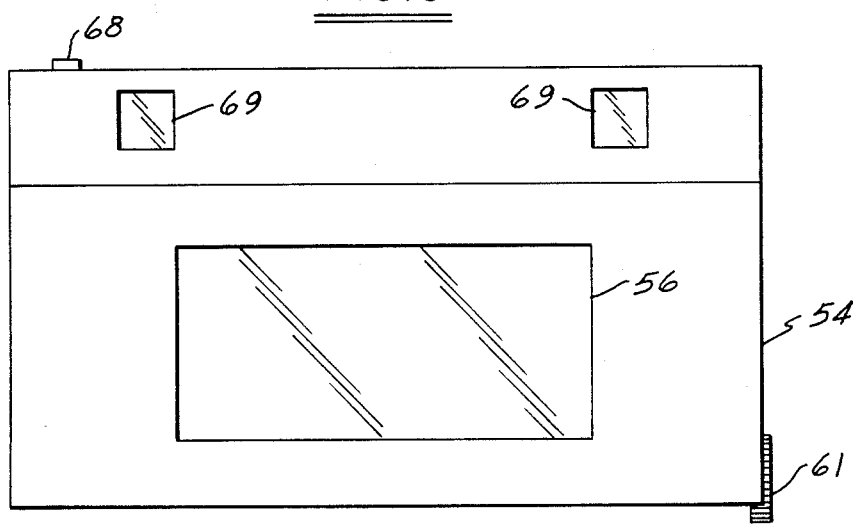
FIG. 5 is a front view of the camera in FIG. 3.

FIG. 5 shows the camera from a front view, particularly showing the optical window 56 and view finder-range finder lenses 69 which correspond to part 40 in cited U.S. Pat. No. 2,186,615.

Figure 6:
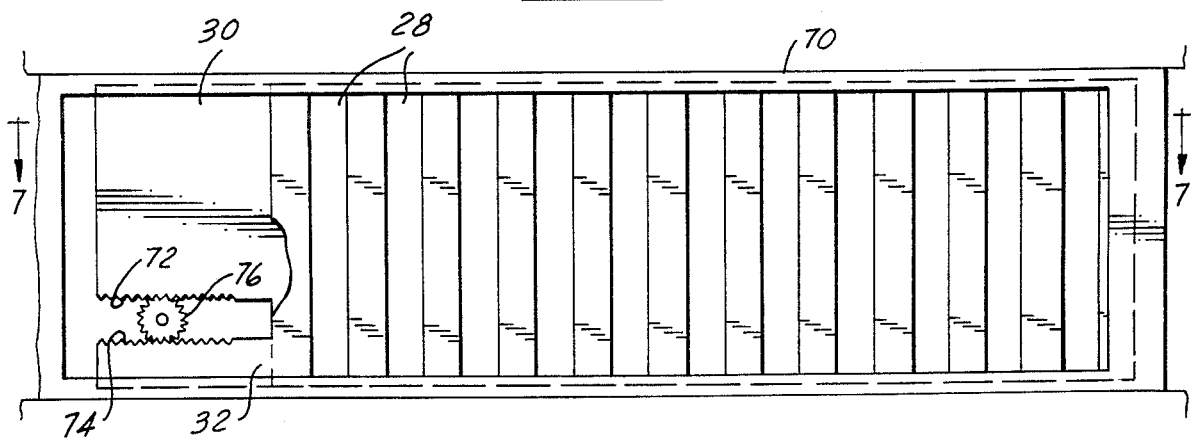
FIG. 6 is an enlarged front view of the baffle set and f-stop control used in the camera of FIGS. 3-5.

FIG. 6 is a front view of the baffle set and f-stop mechanism 26. It will be seen by reference to the figure that the apertures 28 are regularly spaced within a structure 70; the actual spacing is determined by the diameter of the lenslets 16. Baffle 32 is shown in the figure with baffle 30 directly behind it. The mechanism to effect opening and closing of the baffle set aperture is shown in the lower left-hand section of the figure where a toothed section 72 and 74 respectively in each of the baffle structures 30 and 32 cooperatively engage a toothed gear 76 in such manner that as the gear rotates the aperture area is either increased or decreased as baffle 30 moves oppositely to baffle 32. In FIG. 6 the aperture is shown fully open. As the gear is rotated clockwise, baffle 32 moves to the left while 30 moves to the right, causing the aperture areas to decrease; increasing the aperture diameter is achieved by an opposite rotation of the gear. In an alternative embodiment using a fixed aperture baffle set, the means disclosed could be used to vary the width of the slit 24 in mask 22.

FIGS. 7 through 9 show a top view, along lines 7—7 in FIG. 6, of the baffle set, disclosing how rotation of the gear varies the effective aperture area. In FIG. 7 the baffles are positioned so that the apertures exactly coincide; this was the situation described in FIG. 6. In FIG. 8 the gear is rotated clockwise, causing baffle 32 to move to the left and baffle 30 to move to the right. Notice that the center of the aperture never varies, as indicated by dashed line 78 which represents the optical axis of the lenslet at that location. In FIG. 9 the baffles have moved sufficiently so as to completely eliminate the aperture. By reversing direction of the gear, the aperture may be increased to its former value in FIG. 7.

FIG. 10 is a plan view of an alternative embodiment of the optical imaging system in which a second row of lenticular lenses 80 are used between the baffle set and the film with the optical axes of each secondary lenslet directly in line, as indicated by dashed line 82, with the optical axis of the primary lenslets, as shown in the figure. The benefit of having two sets of lenticular lenses is creation of a cooperative imaging effect among each set of lenslets, as defined along the optical axis of the primary lenslets, exemplified by lenslets "A" and "B" in the figure. The use of what is effectively a compound lens imaging system improves the optical quality and reduces lens aberration effects.

Therefore, what is described is a simple to use, easy to set up, and relatively inexpensive camera for taking simultaneously a series of images of a scene illuminated in incoherent light, each having sequentially differing viewpoints.

HOLOGRAM CONSTRUCTION APPARATUS AND METHOD

FIG. 11 shows a plan view of the construction apparatus which is utilized to construct a hologram from the series of images taken with the camera described above. An illumination system 84 is provided to image plane wave coherent light 86 incident on the transparency 88 in a manner substantially consistent with the aforementioned camera apparatus. Through this means, the transparency acts as an "object" for an illumination beam used in making the hologram: the multiple images recorded thereon are processed by the optics of the illumination system into a reconstruction of the scene originally photographed by the camera. When the processed illumination beam 90 which exits the illumination system 84 strikes a holographic film 92 coincidentally with a reference beam 94 which is mutually coherent with the processed illumination beam, an interference pattern is formed, exposing the film and resulting in a rainbow hologram recording.

To create a plane wave coherent light beam, the following preferred apparatus and methods are employed. A source of coherent light 96, ordinarily being a laser, produces a primary beam 98 which strikes a beam splitter 100, which is generally a partially reflective mirror at an angle to the beam, causing the beam to split into two separate beams 102 and 104. The illumination beam 102 then passes through a spatial filter 106 which consists of a microscope objective lens 108 and pin-hole 110 in combination designed to expand the beam and remove optical noise. Finally, the beam divergently emerges from the spatial filter and passes through a collimating lens 112 which transforms the divergent beam into a plane wave beam of coherent light. This is the unprocessed plane wave beam 86.

The beam 86 now it utilized as the source of illumination for the illumination system 84 containing the transparency 88. The illumination system is comprised of a cylindrical lens 114 which is used to converge the beam 86 along the y dimension, a beam modifier, which in the embodiment shown is a diffusion screen 116 which acts as a light scatterer ensuring all the pupil of the optical system is used, the transparency 88 containing the multiple two-dimensional images of the scene earlier photographed, a lenticular lens array 118 having the same optical characteristics and relation to the images on the transparency as were in the camera apparatus for independently focusing the beam in the x dimension, a baffle 120 having a series of optical cross-talk limiting fixed apertures disposed in relation to the lenslets as in the camera, a cylindrical lens doublet with integral mask slitted centrally along the x axis forming a cylindrical lens system 122 for adjustably focusing the beam independently in the y dimension having the optical properties, physical characteristics and positional adjustably along the z—z axis as the camera cylindrical lens system 14, and finally a cylindrical lens 124 oriented with its convex side toward the holographic film 92, used in conjunction with lens system 122 for added focusing in the y dimension.

In the preferred embodiment, the processed beam 90 is focused in the y dimension at the holographic film. This ensures that blurring of the resulting hologram will not occur. The processed beam 90 is intentionally defocused in the x dimension at the holographic film, by bringing the holographic film closer to the lenticular lens array sufficient to ensure all the scene image appears on the holographic film in the x dimension, assure an excellent depth of field for the hologram and reduce grain and speckle effects, as further defined by the Applicant's scientific journal articles cited and incorporated by reference in the Summary of the Invention. Additionally, the cylindrical lens system 122 acts to cause spatial bandwidth reduction in the vertical dimension, as is characteristic of rainbow holography while the cylindrical lens 124 acts to ensure all the scene appears on the holographic film by adjusting image size in the y dimension.

In order to produce an interference pattern on the holographic film, reference beam 104 is directed, via a mirror 126, through a spatial filter 128, which is similar to spatial filter 106, and onto the holographic film.

Thus, coincident striking by the processed illumination beam 90, which has gone through all the images on the transparency and therefore contains all three-dimensional information along the x—x axis of the scene originally photographed by the camera apparatus, and the reference beam 94, disposed at an angle thereto approximately between 35 and 45 degrees causes an interference pattern to appear, exposing the holographic film 92 and forming a rainbow hologram. The hologram produced is preferably viewable with incoherent light developed in the form of a transparency for either back illumination or front illumination when combined with a reflective coating in the back of the hologram.

If the holographic film were to be developed after a single exposure in the manner described above, the hologram would contain a number of vertical dark bands or grid lines, corresponding to the lenslet baffle array. To minimize these grid lines, the holographic film is shifted along the x—x axis approximately one-half of an image width. The holographic film is then re-exposed, each of the exposures combining to yield a proper exposure of the holographic film, and the resulting hologram will not possess the vertical dark bands. Provided the lenslet-image width is substantially equal to or less than two millimeters, there will not be any perceptible blurring as a result of the shift of the holographic film relative to the transparency. Alternately, the transparency, baffle and lenticular lens array may be shifted, relative to the holographic film sheet, prior to the second exposure.

Correct exposure of the holographic film is based upon the use of lenticular arrays in both the camera and construction apparatus being of the same optically effective spatial size and lenslet cross section, as well as duplication of the relative function of the baffle and cylindrical lens system. For instance, the construction apparatus may have a 200 unit lenslet array, for accommodating cameras of any number lenslet arrays up to 200. If a camera employed 100 lenslets, the central 100 lenslets of the illumination system would then be used to achieve the same optically effective spatial size of the lenticular array. Actual exposure control is achieved by placing a shutter mechanism 129 in the path of the primary beam 18, having a manner of operation similar to that described for the camera embodiment. Alternatively, the laser could be turned on for a predetermined duration or the shutter could be placed over the holographic film. In this way, when the illumination beam is sent through the transparency illumination system, a three-dimensional reconstruction of the scene originally photographed with the camera results, forming the object for the hologram.

In order to ensure that proper focus in the y dimension is achieved by the lens system, a code can be recorded when the scene is photographed by the camera, which is decoded and used to adjust manually or automatically the position of the cylindrical lens system 122 in conjunction with lens 124 to focus light in the y dimension on the holographic film. Alternatively, if no code was recorded, a user can place a screen at the location of the holographic film and manually set the focus by inspection of the image thereon in response to turning on the primary beam. Preferably, however, the code recorded on the transparency would be decoded and the cylindrical lens system positioned automatically. Additionally, a light tight environment coupled with a vibration free base 126 is required to complement the hologram construction apparatus. Both of these conditions are easily met by techniques commonly used by those skilled in the art.

FIG. 12 is a detailed side view along lines 12—12 in FIG. 11, of the transparency illumination system 84. The figure, in combination with FIG. 11, shows that the lenticular array, baffle set, transparency, and diffuser all have similar real dimensions. From the figure, it will be seen that the cylindrical lens system 122 is composed of two cylindrical lenses 130 and 131 and a mask 132 having a central slit 134 along axis x—x.

The general lay-out of the construction apparatus as detailed above is substantially a matter of design choice, as there exists a great deal of flexibility in the manner of directing the coherent light beams. Further, it should be noted that the transparency containing a series of sequential images of a scene could have been assembled from a plurality of spaced photographs of the scene. A camera having one lenticular lenslet coupled with a cylindrical lens system, as discussed above, could be used to sequentially take each photograph from different viewpoints.

FIG. 13 shows an alternative embodiment for the transparency illumination system in which the beam modifier, shown as a diffuser screen in FIG. 10, employed to ensure that all the pupil of the optical system is in use, is replaced by a lenticular lens array 136 which is similar dimensionally to lenticular lens array 118 and positioned coincident with the optical axis of lenticular lens array 118. Such an array in place of the diffuser can function in superior fashion as a beam modifier to ensure all the pupil of the optical system is used.

The foregoing description is intended for use with monochromatic coherent light such as produced by a He-Ne laser. Construction of a color rainbow hologram is readily provided by modification of the construction apparatus in conformity with Applicant's scientific journal article "Generation of Colr Images with One-Step Rainbow Holograms", App. Opt. 17, 1490 (1978) cited and incorporated by reference in the Summary of the Invention.

The quality of the rainbow hologram produced according to the present invention is greatly improved by:

(a) Reducing optical noise. Grains and speckles from the ground glass diffuser can be reduced by choice of quality of screen; however, there is a fundamental limitation to the reduction. By the method of the present invention, which has independent focusing in the y and x dimensions, the images of these imperfections are given but small magnification by lenses 122 and 124 in the y dimension, and are de-focused in the x dimension at the holographic film, resulting in a smooth, uniform background.

(b) Resolution and depth of field. The combination of using high quality optics, an achromatic and astigmatic imaging system employing doublet cylindrical lenses with integral slitted mask for independent imaging in the y dimension, a lenticular array for independently imaging in the x dimension, a baffle set to eliminate optical cross talk a high quality diffuser screen or lenticular array in combination with a cylindrical lens to ensure all the pupil of the imaging system is employed, and finally a spatial filter coupled with a collimating lens to filter the beam and to form it into a plane wave, results in superior optical quality. Additionally, the image is defocused intentionally in the x dimension to increase depth of field and focused in the y dimensions to reduce color blur of the image. Finally, the resulting hologram has spatial bandwidth reduction along the vertical, or y, axis, resulting in an improved holographic recording consistent with the techniques of rainbow holography.

(c) Reducing grid line effect. By exposing the holographic film, then shifting the film in relation to the transparency illumination system by one-half an image width along the x—x axis and then re-exposing the holographic film, this effect can be very acceptably reduced (each of the exposures adding up to properly expose the holographic film). This may be achieved by shifting the position of either the holographic film or the transparency, baffle, and lenticular lens array as a unit. No image smear will be detected as long as the lenslet cross section is less than human eye pupil size.

Therefore, what is described is a single exposure system to convert multiple parallax transparencies of a scene into a rainbow hologram having the same quality and impressive depth as if the scene itself had been the object of the holographic recording.

In operation, the user would load the camera 52 with film, point it at a scene through use of an eyepiece 62 in the view finder 63 and adjust focus by means of the focuser 61 via optical alignment of the range finder indicator also seen in the eyepiece of the view finder. An exposure meter in the view finder allows for setting of the shutter speed in conjunction with a selected f-stop via baffle 26. The scene is photographed by pressing the button 68. The film is developed as a transparency (usually at a lab) and is sent to a lab for processing into a hologram. The hologram construction apparatus at the lab uses a code recordedby the camera on the transparency to indicate focusing information for cylindrical lens system 122. This will ensure that all the image size will appear on the holographic film and that the images are focused in the y dimension. The particular number of lenslets in the camera will define the number of corresponding images on the transparency 88 and an equal number of lenslets in the illumination apparatus 84 would be used. An exposure control 129 allows beams 90 and 94 to strike holographic film 92 forming a rainbow hologram.

To those skilled in the art to which this invention appertains, the above described preferred embodiment may be subject to change or modification. Such changes or modifications can be carried out without departing from the scope of the invention, which is intended to be limited only by the scope of the appended claims.

I claim:

1. Method of forming a hologram, comprising the steps of:
   (a) simultaneously creating a plurality of adjacent images on a photographic transparency, each having a sequentially differing viewpoint along an X axis of a scene illuminated by incoherent light using a camera;
   (b) placing said transparency into an illumination system;
   (c) directing a first beam of coherent light simultaneously through each of said images on said transparency;
   (d) independently focusing said first beam in an X dimension as defined by said X axis to illuminate a holographic film so as to provide good depth of field, retaining all parallax information of said images in said X dimension;
   (e) independently focusing said first beam in a Y dimension as defined by a Y axis so as to illuminate a holographic film, limiting parallax information of said images in said Y dimension;
   (f) simultaneously directing a second beam of mutually coherent light with said first beam onto said holographic film at an angle relative to said first beam so as to cause an interference pattern to appear on said holographic film suitable for producing a rainbow hologram; and
   (g) developing said holographic film to form of a rainbow hologram.

2. The method of claim 1, additionally comprising the step of positionally shifting said holographic film in relation to said transparency substantially one-half the width of said images prior to the step (g) then re-exposing said holographic film in order to reduce grid line effects.

3. The method of claim 1, wherein the step (a) of creating a plurality of images further comprises the substeps of focusing light from said scene for each said image on a photographic film independently in said X dimension and independently in said Y dimension, exposing said photographic film to said light for each said image, and developing said photographic film into a transparency.

4. The method of claim 3, wherein the step (a) further includes adjustably focusing said light in said Y dimension by positionally moving a lens in said camera and recording on said film a coded instruction of said lens location relative to said film during said step of exposing.

5. The method of claim 4, wherein the steop (e) further includes adjustably focusing said first beam in said Y dimension using said illumination system in response to said coded instruction.

6. The method of claim 1, wherein the steps (c) and (f) further include the substeps of: optically filtering, forming a plane wave and modifying said first beam so as to ensure that substantially all the pupil of the optics of the illumination system is used, and; optically filtering said second beam.

7. Method of forming a hologram, comprising the steps of:
   exposing a photographic film to a scene illuminated by incoherent light using a camera having imaging means for simultaneously producing a plurality of adjacent images on said photographic film, each having a sequentially differing viewpoint of said scene along an X axis, using an optical system having means for focusing said light independently in an X dimension as defined by said X axis and a Y dimension as defined by a Y axis;
   developing said photographic film into a transparency;
   placing said transparency into an illumination system;
   directing said first beam of coherent light simultaneously through each of said images on said transparency in combination with said illumination system;
   independently focusing said first beam in an X dimension as defined by said X axis to illuminate a holographic film so as to provide good depth of field, retaining all parallax information of said image in said X dimension;
   independently focusing said second beam in a Y dimension as defined by a Y axis so as to illuminate a holographic film, limiting parallax information of said images in said Y dimension;

simultaneously directing a second beam of mutually coherent light with said first beam onto said holographic film at an angle relative to said first beam so as to cause an interference pattern to appear on said holographic film suitable for producing a rainbow hologram; and developing said holographic film in the form of a rainbow hologram.

8. A photographic camera for photographing a scene illuminated by incoherent light, comprising in combination:

means for providing a light tight environment;

imaging means for producing, in cooperation with said light tight environment, a plurality of adjacent images along an X axis, each having a sequentially differing viewpoint of said scene, using an optical system having means for focusing said light independently in an X dimension as defined by said X axis and independently in a Y dimension as defined by a Y axis; and means for positioning photographic film in relation to said light tight environment so as to be focusably exposable to said images.

9. The camera of claim 8, wherein said imaging means comprises an optical system provided with a cylindrical lens system to focus said light on said photographic film in said Y dimension and at least one lenticular lens to independently focus light on said photographic film in said X dimension.

10. The camera of claim 9, wherein a plurality of said lenticular lenses are provided forming an array of lenslets aligned side-by-side along the X axis and lying in a common plane.

11. The camera of claim 10, wherein said optical system further comprises a baffle set having a plurality of elongated apertures, each of which act cooperatively with a lenslet, to reduce optical crosstalk between adjacent lenslets of said array.

12. The camera of claim 9, wherein said optical system further comprises adjusting means for varying the relative position between said cylindrical lens system and said photographic film so that said light may be focused thereon in said Y dimension.

13. The camera of claim 12, further comprising means to record a coded instruction indicating the position of said cylindrical lens system in relation to said photographic film when said photographic film is exposed to said light.

14. The camera of claim 13, wherein said adjusting means further comprises view finder means in combination with range finder means cooperating with said cylindrical lens system to allow positioning of said cylindrical lens system at a location in which focusing on said photographic film is achieved in said Y dimension.

15. The camera of claim 9, wherein said cylindrical lens system is comprised of a cylindrical lens doublet with an integral mask slitted centrally along said X axis.

16. The camera of claim 9, wherein said optical system further includes a second lenticular lens providing a pair for the first said lenticular lens acting cooperatively with said first lenticular lens to focus light on said photographic film in said X dimension.

17. The camera of claim 9, further comprising means for controlling exposure of said photographic film comprising, in combination: a view finder with integral exposure meter, a shutter, and a shutter button, cooperatively engaging so as to regulate the time of said exposure.

18. A photographic camera for photographing a scene illuminated by incoherent light, comprising in combination:

a light tight camera housing;

an optical system for simultaneously producing a plurality of adjacent images of said scene, comprising a lenticular lens array to independently focus said light in an X dimension defined by an X axis and a cylindrical lens system comprising at least one focusing cylindrical lens to independently focus light in a Y dimension defined by a Y axis, said optical system cooperatively mounted to the interior of said housing so as to permit light to enter said optical system;

means for positioning photographic film in relation to said housing to receive focused light passing through said optical system; and means for controlling exposure of said photographic film.

19. The camera of claim 18, wherein said cylindrical lens system is comprised of a cylindrical lens doublet with an integral mask slitted centrally along said X axis.

20. The camera of claim 19, wherein said slit on said mask is adjustable in width permitting f-stop control.

21. The camera of claim 18, further comprising a view finder for viewing the scene to be photographed.

22. The camera of claim 21, wherein said cylindrical lens system is adjustably mounted to said housing so as to allow variation in distance between said cylindrical lens system and said photographic film, for focusing said light on said photographic film in said Y dimension, said focusing being achieved by cooperation between said view finder and said adjustable mounting.

23. The camera of claim 22, further comprising means for recording a coded instruction indicating position of said cylindrical lens system in relation to said photographic film when said photographic film is exposed to said light.

24. The camera of claimi 18, wherein said optical system further comprises a baffle set which acts cooperatively with a lenslet to reduce optical crosstalk between adjacent lenslets of said array.

25. The camera of claim 24, wherein said baffle set has adjustable aperture width permitting f-stop control.

26. The camera of claim 24, further comprising a second lenticular lens array located between said baffle set and said photographic film acting cooperatively with first said lenticular lens array to focus light on said photographic film in said X dimension.

27. Apparatus to create a rainbow hologram produced from a plurality of adjacent images on a photographic transparency each having a sequentially differing viewpoint along an X axis of a scene illuminated by incoherent light, comprising in combination:

beam means for providing a first and second beam of mutually coherent light;

holder means for positioning said transparency within the path of said first beam;

illumination means for independently focusing said first beam in an X dimension as defined by said X axis and independently focusing said first beam in a Y dimension as defined by a Y axis, retaining all parallax information of said images in said X dimension and limiting parallax information of said images in said Y dimension;

means for holding a holographic film in relation to said transparency so that the first beam emanating from said illumination means is focused thereon; and means for simultaneously directing said second beam onto said holographic film at an angle relative to said first beam so as to cause an interference pattern to appear on said holographic film suitable for producing a rainbow hologram.

28. Apparatus of claim 27, wherein said beam means further comprises a laser for producing a primary beam of coherent light and a partially reflective mirror for dividing said primary beam into a first and a second beam of mutually coherent light.

29. Apparatus of claim 27, wherein said beam means further comprises a partially reflective mirror for originating said first beam from a primary beam, a spatial filter for reducing optical noise and expanding said first beam, and a convex lens for forming said first beam into a plane wave beam.

30. Apparatus of claim 27, wherein said beam means further comprises a partially reflective mirror for originating said second beam from a primary beam, a mirror for directing said second beam, and a spatial filter for reducing optical noise and expanding said second beam.

31. Apparatus of claim 27, further comprising means for controlling exposure of said holographic film simultaneously to said first and second beams.

32. Apparatus of claim 27, further comprising means for providing a vibration free and light tight environment for said apparatus.

33. Apparatus of claim 27, wherein said holding means cooperating with said illuminating means comprises an illumination system provided with beam modifier means for ensuring that all the pupil of the optics of said illuminating means is used when said first beam is directed therethrough, means for holding said transparency so that said images are simultaneously receivable to said first beam after passing through said modifier means, a lenticular lens array composed of a series of lenslets disposed in relation to said images so as to independently focus in said X dimension said first beam emanating from each of said images, and a cylindrical lens system having a mask which is centrally slitted along said X axis for limiting parallax information of said images in said Y dimension and disposed in relation to said transparency so as to independently focus in said Y dimension said first beam emanating from each of said images.

34. Apparatus of claim 33, wherein said beam modifier means comprises a diffusion screen oriented in relation to said first beam so as to provide illumination for each of said images.

35. Apparatus of claim 33, wherein said beam modifier means comprises a second lenticular lens array oriented in relation to said first beam so as to provide illumination for each of said images.

36. Apparatus of claim 33, wherein said illumination system further comprises means for adjustably positioning said cylindrical lens system in relation to said transparency.

37. Apparatus of claim 36, wherein said cylindrical lens system is positioned in relation to said transparency so as to focus in said Y dimension said first beam emanating from each of said images on said holographic film in response to a coded instruction recorded on said transparency.

38. Apparatus of claim 36, wherein said cylindrical lens system comprises a cylindrical lens doublet with an integral mask slitted centrally along the X axis.

39. Apparatus of claim 33, wherein said illumination system further comprises a cylindrical lens disposed in relation to said cylindrical lens system to further focus said first beam in said Y dimension.

40. Apparatus of claim 33, further comprising a baffle set having a series of apertures disposed in relation to said lenslets so as to permit said first beam emanating from each of said lenslets to pass therethrough and eliminate optical crosstalk among adjacent said lenslets.

41. Apparatus to create a rainbow hologram produced from a plurality of adjacent images on a photographic transparency each having a sequentially differing viewpoint along an X axis of a scene illuminated by incoherent light, comprising in combination:

beam means for providing a first and second beam of mutually coherent light;

an illumination system provided with beam modifier means for ensuring that substantially all the pupil of the optics of said illuminating system is used when said first beam is directed therethrough; means for holding said transparency so that said images are simultaneously receivable to said first beam after passing through said modifier means; a lenticular lens array composed of a series of lenslets disposed in relation to said images so as to independently focus in an X dimension as defined by said X axis said first beam emanating from each of said images; a baffle set having a series of apertures disposed in relation to said lenslets so as to allow said first beam emanating from each of said lenslets to pass therethrough and to eliminate optical crosstalk among adjacent said lenslets; and a cylindrical lens system having a mask which is centrally slitted along said X axis for limiting parallax information in a Y dimension as defined by a Y axis and disposed in relation to said transparency so as to independently focus in said Y dimension said first beam emanating from each of said images;

means for holding a holographic film in relation to said transparency so that the first beam emanating from said illumination means is focused thereon; and means for simultaneously directing said second beam onto said holographic film at an angle relative to said first beam so as to cause an interference pattern to appear on said holographic film suitable for producing a rainbow hologram.

* * * * *

UNITED STATES PATENT AND TRADEMARK OFFICE
CERTIFICATE OF CORRECTION

PATENT NO. : 4,783,133

DATED : November 8, 1988

INVENTOR(S) : Hsuan S. Chen

It is certified that error appears in the above-identified patent and that said Letters Patent is hereby corrected as shown below:

In claim 1, line 9, column 14, please delete the word "to" and insert in its place the phrase ---in the---.

In claim 2, line 14, column 14, please add immediately following the letter "(g)" the punctuation mark ---,---.

In claim 5, line 32, column 14, please delete the word "steop" and insert in its place the word ---step---.

In claim 6, line 40, column 14, please delete the word "is" and insert in its place the word ---are---.

In claim 7, line 49, column 14, please delete the punctuation mark ",".

In claim 7, line 63, column 14, please delete the word "image" and insert in its place the word ---images---.

In claim 24, line 40, column 16, please delete the word "claimi" and insert in its place the word ---claim---.

UNITED STATES PATENT AND TRADEMARK OFFICE
CERTIFICATE OF CORRECTION

PATENT NO. : 4,783,133

DATED : November 8, 1988

INVENTOR(S) : Hsuan S. Chen

It is certified that error appears in the above-identified patent and that said Letters Patent is hereby corrected as shown below:

In claim 33, line 35, column 17, please delete the phrase "means is" and insert in its place the phrase --means are--.

Signed and Sealed this

Eleventh Day of April, 1989

Attest:

DONALD J. QUIGG

Attesting Officer

Commissioner of Patents and Trademarks